No. 875,750. PATENTED JAN. 7, 1908.
E. C. VAN NORT, Jr.
CARBON BRUSH FOR COMMUTATORS AND THE METHOD OF PREPARING SAME.
APPLICATION FILED MAR. 19, 1906.

Attest:
M. P. Smith
H. J. Fletcher

Inventor,
E. C. Van Nort, Jr.
By Higdon & Longan
Attys.

UNITED STATES PATENT OFFICE.

EDWIN C. VAN NORT, JR., OF ST. LOUIS, MISSOURI.

CARBON BRUSH FOR COMMUTATORS AND THE METHOD OF PREPARING SAME.

No. 875,750.

Specification of Letters Patent.

Patented Jan. 7, 1908.

Application filed March 19, 1906. Serial No. 306,868.

*To all whom it may concern:*

Be it known that I, EDWIN C. VAN NORT, Jr., a citizen of the United States, and resident of St. Louis, Missouri, have invented certain new and useful Improvements in Carbon Brushes for Commutators and the Method of Preparing Same, of which the following is a specification containing a full, clear, and exact description, reference being had to the accompanying drawings, forming a part hereof.

My invention relates to a carbon brush for commutators, and the method of preparing same.

The object of my invention is to prepare a suitable liquid compound in which the carbon brushes are immersed until they absorb a certain quantity of the compound, for the purpose of making said brushes self-lubricating, and greatly increasing the length of time which said brushes can be used in actual service, and also its electrical conductivity.

Figure 1:
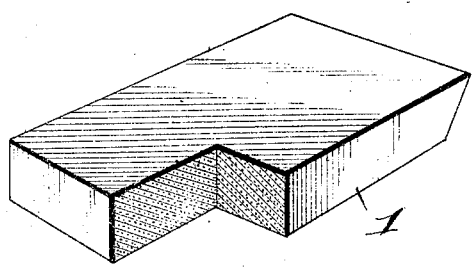
Figure 2:
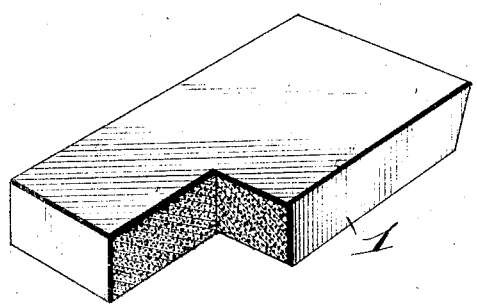

In the drawings:—Figure 1 is a perspective view of a carbon brush before the same is treated by my improved method, and a section of said brush being removed; Fig. 2 is a view analogous to Fig. 1, and showing the brush after the same has been treated by my improved method.

1 designates a brush which is manufactured in the usual manner of finely divided particles of carbon, bonded together in any suitable manner, and of such size as to be readily positioned in the usual brush holder.

In making up approximately 7 lbs. of the composition with which the brushes are treated, I make use of 5 lbs. of purified paraffin, 2 lbs. of commercial yellow wax, 2 oz. of finely powdered plumbago, and 20 drops of oil of citronella, the latter being used for the purpose of preventing rats, mice, and insects from eating the composition. The paraffin and yellow wax are melted and mixed, and while in a liquid state, the plumbago and oil of citronella are added. The composition is now heated until it is brought to the boiling point; and the carbon brushes are now immersed in the boiling liquid. This action necessarily causes said carbon brushes to expand to a certain degree, or drives a certain amount of the air out of the air cells in the brushes, and, as a result, in a short period of time the brushes become thoroughly saturated with the composition.

The brushes in use after treatment lubricate the surface of the commutator, owing to the presence of the plumbago, and the paraffin and wax, and by this treatment the wear on the brushes and commutator is decreased; hence they last much longer than the untreated brushes, and the life of the commutator is prolonged.

Carbon brushes treated by my improved method wear much more evenly than the untreated brushes, and much time and labor is saved in lubricating commutators, which is necessary where untreated brushes are made use of.

The oil of citronella is not absolutely necessary in the composition, as it is only used for preventing the compound from being eaten by rats and mice.

I have found out by experience, by treating the brushes by the above method, that the heat in both commutator and brushes is greatly decreased.

I claim:

1. The herein described process of producing commutator brushes, which consists in taking blocks of ordinary commercially prepared carbon, such as is utilized for carbon brushes, and immersing and treating said blocks in a boiling liquid, which holds in suspension finely powdered plumbago or graphite.

2. The herein described process of producing commutator brushes, which consists in taking blocks of ordinary commercially prepared carbon, such as is utilized for carbon brushes, and immersing and retaining said blocks in boiling wax of high penetrative power, having in suspension finely powdered plumbago or graphite.

3. The herein described process of producing commutator brushes, which consists in taking blocks of ordinary commercially prepared carbon, such as is utilized for carbon brushes, and immersing said block in an oleaginous boiling liquid, having in suspension finely powdered plumbago or graphite.

4. The herein described method of preparing for use brushes for commutators, which consists in first taking a block of commercially prepared commutator brush material, cutting said block into proper size for commutator brushes, and third, immersing the brushes in a boiling solution of paraffin, yellow wax and plumbago.

5. As a new article of manufacture, a commutator brush, constructed of a block of carbon, which is permeated throughout with wax, carrying finely powdered plumbago or graphite.

6. As a new article of manufacture, a commutator brush of carbon, permeated throughout with an oleaginous substance, carrying finely divided particles of plumbago or graphite.

In testimony whereof, I have signed my name to this specification, in presence of two subscribing witnesses.

EDWIN C. VAN NORT, Jr.

Witnesses:
M. P. SMITH,
H. G. FLETCHER.